United States Patent Office 3,421,064
Patented Jan. 7, 1969

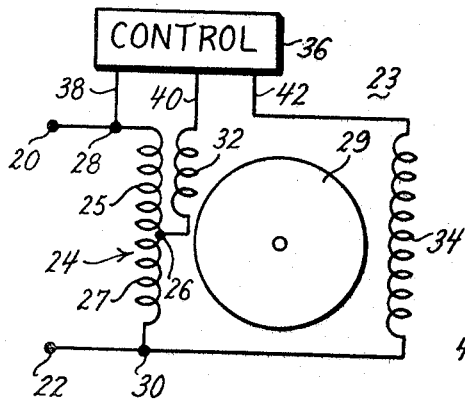
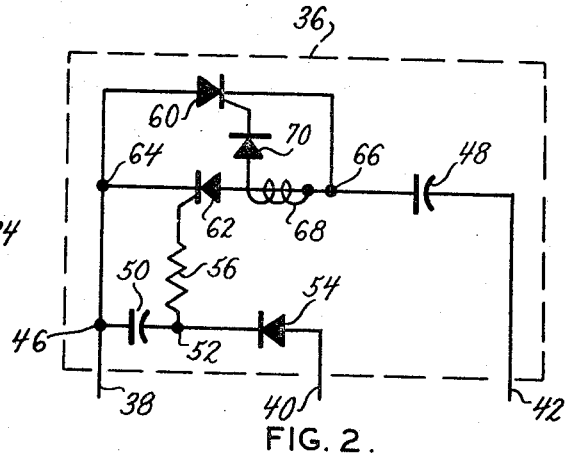
FIG. 1.
FIG. 2.
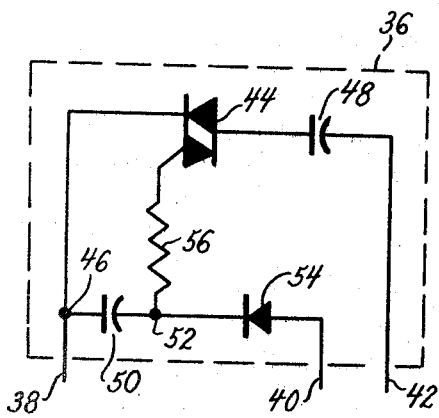
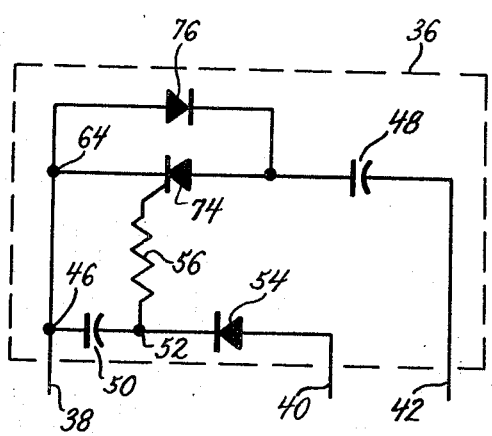
FIG. 3.
FIG. 4.
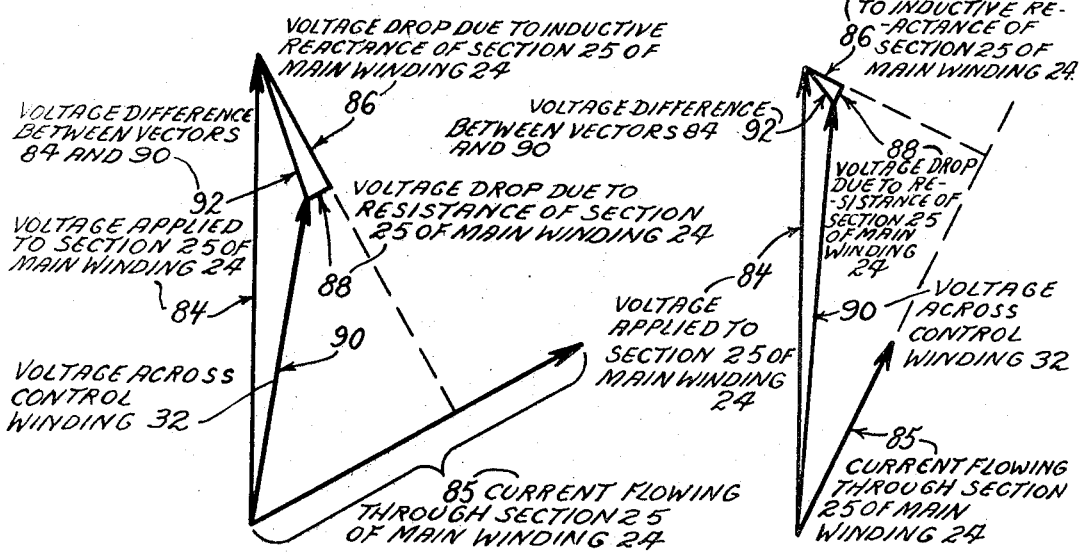
FIG. 5.
FIG. 6.

3,421,064
ELECTRIC MOTOR THAT DEENERGIZES STARTING WINDING THEREOF WHEN DIFFERENCE BETWEEN VOLTAGES ACROSS RUNNING AND STARTING WINDINGS THEREOF CHANGES AS ROTOR SPEED INCREASES
Graham R. Phillips, University City, Mo., assignor to Century Electric Company, St. Louis, Mo., a corporation of Missouri
Filed Mar. 25, 1966, Ser. No. 537,354
U.S. Cl. 318—220                6 Claims
Int. Cl. H02p 5/28

ABSTRACT OF THE DISCLOSURE

A control winding of an electric motor is magnetically coupled to the main winding of that motor; and those windings coact to develop a voltage difference which causes a selectively-conductive element to energize the starting winding of that motor until the rotor of that motor attains a predetermined speed and thereafter coact to provide a difference voltage which permits that selectively-conductive element to deenergize that starting winding.

---

This invention relates to improvements in electric motors. More particularly, this invention relates to improvements in induction motors.

It is, therefore, an object of the present invention to provide an improved induction motor.

Many induction motors have starting windings in addition to the main windings thereof; and those starting windings are initially energized to help the main windings initiate the rotation of the rotors of those motors. After those rotors have attained predetermined minimum speeds, those starting windings are deenergized; and thereafter the main windings of those motors drive those rotors. Various control systems have been proposed for initially energizing the starting windings of induction motors and subsequently deenergizing those starting windings; but some of those control systems utilized expensive components, and other of those control systems utilized bulky components. It would be desirable to provide a control system which could initially energize the starting winding of an induction motor and subsequently deenergize that starting winding but which was inexpensive and compact. The present invention provides such a control system; and it is, therefore, an object of the present invention to provide a control system which can initially energize the starting winding of an induction motor and subsequently deenergize that starting winding but which is inexpensive and compact.

The control system provided by the present invention utilizes a control winding which is magnetically coupled to the main winding of an induction motor, and which develops a voltage vector that can be compared with a voltage vector developed across a portion of the main winding. The vector difference between those voltage vectors will be quite large whenever the main winding is initially energized, and will be substantially smaller after the rotor of the motor has reached a predetermined minimum speed. That vector difference can cause a voltage-sensitive control to initially energize the starting winding of the motor and then subsequently deenergize that starting winding after the rotor of the motor has reached a predetermined minimum speed. It is, therefore, an object of the present invention to provide an induction motor with a control winding that is magnetically coupled to the main winding of that motor and that can develop a voltage vector which can be compared with a voltage vector developed across a portion of that main winding to produce a vector difference which can cause a voltage-sensitive control to initially energize the starting winding of that motor and then subsequently deenergize that starting winding.

Other and further objects and advantages of the present invention should become apparent from an examination of the drawing and accompanying description.

In the drawing and accompanying description some preferred embodiments of the present invention are shown and described but it is to be understood that the drawing and accompanying description are for the purpose of illustration only and do not limit the invention and that the invention will be defined by the appended claims.

In the drawing, FIG. 1 is a schematic diagram showing one induction motor that is made in accordance with the principles and teachings of the present invention, FIG. 2 is a detailed showing of one form of control that can be used with the motor of FIG. 1, FIG. 3 is a detailed view of another form of control that can be used with the motor of FIG. 1, FIG. 4 is a detailed showing of still another form of control that can be used with the motor of FIG. 1, FIG. 5 is a vector diagram showing some of the vectors which are developed when the motor of FIG. 1 is initially energized, and FIG. 6 is a vector diagram showing the vectors of FIG. 5 after the rotor of the motor has attained a predetermined minimum speed.

Referring to the drawing in detail, the numerals 20 and 22 denote terminals that can be connected to a suitable source of single phase alternating current. The numeral 24 generally denotes the main winding of an induction motor 23; and that main winding has a tap 26 which defines a section 25 and a section 27. The section 25 is connected to the terminal 20 by a junction 28; and the section 27 is connected to the terminal 22 by a junction 30.

The numeral 32 denotes a control winding for the induction motor 23; and that control winding is wound on the same magnetic core on which the section 25 of the main winding 24 is wound. As a result, that control winding will be magnetically coupled to the section 25 of that main winding. In one preferred embodiment of the present invention, the control winding 32 is wound in the same slots of the stator of motor 23 in which the section 25 of the main winding 24 is wound. Where desired, the control winding 32 can be wound with the same pitch and polarity as the section 25 of the main winding 24. However, the control winding 32 can be disposed within the motor in different ways, and have different pitches and different orientations as long as it is magnetically coupled to a section of the main winding 24. The lower terminal of that control winding is connected to the tap 26 of the main winding 24, and is thus connected to the lower terminal of the section 25 of that main winding.

The numeral 34 denotes the starting winding of the motor 23; and that winding is electrically displaced ninety degrees from the main winding 24. The lower terminal of the starting winding 34 is connected to the terminal 22 by the junction 30, and the upper terminal of that starting winding is connected to a control 36 by a conductor 42. The upper terminal of the control winding 32 is connected to that control by a conductor 40; and the section 25 of the main winding 25 is connected to that control by the junction 28 and a conductor 38.

As shown by FIGS. 1 and 2, the terminal 20 can be connected to the upper terminal of the starting winding 34 by junction 28, conductor 38, junctions 46 and 64, controlled rectifier 60 and junction 66 or controlled rectifier 62 and the primary winding of a current transformer 68 and junction 66, a capacitor 48, and conductor 42. The junction 28, conductor 38, junction 46, a capacitor 50, a junction 52, a diode 54, and the conductor 40 connect the section 25 of the main winding 24 to the upper terminal of the control winding 32. A resistor 56 is connected between the junction 52 and the gate of the controlled rectifier 62. The controlled rectifiers 60 and 62, which are preferably silicon controlled rectifiers, are connected in back-to-back relation.

When the terminals 20 and 22 are initially connected to a source of single phase alternating current, as by a switch or by relay contacts, not shown, the controlled rectifiers 60 and 62 will be nonconductive; and hence those controlled rectifiers will initially disconnect the starting winding 34 from the terminals 20 and 22. The voltage applied to the main winding 24, by the terminals 20 and 22 and the junctions 28 and 30, will cause current to flow through the sections 25 and 27 of that main winding; and the current flowing through the section 25 will be high and will lag the voltage applied to that section by a large angle— shown by FIG. 5 to be fairly close to ninety degrees. The voltage applied to the section 25 of the main winding 24 is represented in FIG. 5 by a voltage vector 84, and the current which initially flows through that section is represented by a vector 85. That current will coact with the inductive reactance of the section 25 of the main winding 24 to develop a voltage drop; and that voltage drop is represented in FIG. 5 by a voltage vector 86. The voltage drop due to the resistance of the section 25 of the main winding 24 is represented by the voltage vector 88; and the resultant voltage vector 92 represents the voltage drop across the section 25 that is due ot the overall impedance of that section.

As the current flows through the section 25 of the main winding 24, that section will develop a magnetic field; and that magnetic field will induce a voltage in the control winding 32. The voltage across that control winding is represented in FIG. 5 by the voltage vector 90; and the vector 92 represents the vector difference between the applied voltage vector 84 and the voltage vector 90. That vector difference will be large enough to cause an appreciable amount of current to flow from the upper terminal of the control winding 32 to the upper terminal of the section 25 of the main winding 24; and the diode 54 will make that current flow unidirectional. The capacitor 50 will respond to that unidirectional flow of current to become charged with the right-hand terminal thereof positive. As that capacitor becomes charged, sufficient current will flow from the upper terminal of the control winding 32 via conductor 40, diode 54, junction 52, resistor 56, the gate-to-cathode circuit of controlled rectifier 62, junctions 64 and 46, conductor 38, and junction 28 to the upper terminal of the section 25 to render that controlled rectifier conductive.

As that controlled rectifier becomes conductive, it will permit current to flow from terminal 22 via junction 30, starting winding 34, conductor 42, capacitor 48, junction 66, the primary winding of the current transformer 68, controlled rectifier 62, junction 64, junction 46, conductor 38, and junction 28 to the terminal 20. That flow of current through that starting winding will enable that starting winding and the main winding 24 to apply rotative forces to the rotor 29 of the motor 23. That flow of current through the primary winding of the current transformer 68 will enable the secondary winding of that current transformer to force current to flow through the gate-to-cathode circuit of the controlled rectifier 60.

During the next half-cycle of the alternating current applied to the terminals 20 and 22, the anode of the controlled rectifier 60 will become positive relative to the cathode of that controlled rectifier; and hence that controlled rectifier will permit current to flow from terminal 20 via junction 28, conductor 38, junctions 46 and 64, controlled rectifier 60, junction 66, capacitor 48, conductor 42, starting winding 34, and junction 30 to the terminal 22. That flow of current will enable the starting winding 34 and the main winding 24 to apply additional rotative forces to the rotor 29. As the anode of the controlled rectifier 60 became positive relative to the cathode of that controlled rectifier, the cathode of the controlled rectifier 62 became positive relative to the anode of that controlled rectifier; and, thereupon, the controlled rectifier 62 became nonconductive.

During the following half-cycle of the alternating current applied to the terminals 20 and 22, the controlled rectifier 60 will be rendered nonconductive and the controlled rectifier 62 will become conductive. During further half-cycles of the alternating current applied to the terminals 20 and 22, the controlled rectifiers 60 and 62 will alternately conduct and become nonconductive, but the starting winding 34 will continue to coact with the main winding 24 to apply rotative forces to the rotor 29 of the motor 23.

The value of the current flowing between the upper terminal of the winding 32 and the upper terminal of the section 25 of the main winding 24 will, until the rotor 29 reaches a predetermined minimum speed, be great enough to supply a charge to the capacitor 50, during each half-cycle of the alternating current wherein the upper terminal of the winding 32 is positive relative to the upper terminal of the section 25 of the main winding 24, which will be greater than the charge that leaks off of that capacitor during those half-cycles of the alternating current during which the controlled rectifier 60 is conductive. As a result, until such time as the rotor 29 attains its predetermined minimum speed, the voltage across the capacitor 50 will be great enough to render the controlled rectifier 62 conductive on each alternate half-cycle of the alternating current applied to the terminals 20 and 22.

As the rotor 29 approaches its predetermined minimum speed, the value of the current flowing through the section 25 of the main winding 24 will decrease. Furthermore, that current will lag the voltage applied to the section 25 of the main winding 24 by only a small angle— shown by FIG. 6 to be less than fifteen degrees. The resulting decrease in the angle between the applied voltage vector 84 and the voltage vector 90 will materially reduce the value of the vector voltage 92. That value will be so small that the voltage developed across the capacitor 50 will be insufficient to render the controlled rectifier 62 conductive. Consequently, that controlled rectifier will become nonconductive and will keep current from flowing through the starting winding 34 during those half-cycles of the alternating current applied to the terminal 20 and 22 wherein the terminal 22 is positive relative to the terminal 20. Also, that controlled rectifier will keep current from flowing through the primary winding of the current transformer 68; and hence firing signals will not be applied to the gate-to-cathode circuit of the controlled rectifier 60. Thereupon, the controlled rectifier 60 as well as the controlled rectifier 62 will become nonconductive; and the starting winding 34 will, essentially, be disconnected from the alternating current applied to the terminals 20 and 22. Thereafter, the rotor 29 of the motor 23 will continue to rotate in response to the rotative forces developed by the main winding 24.

In the event the speed of the rotor 29 were to fall below its minimum predetermined value, the value of the current flowing through the section 25 of the main winding 24 would increase and that current would lag the voltage applied to the section 25 of the main winding 24 by a substantial angle. Thereupon, the vector difference 92 between the applied voltage vector 84 and the voltage vector 90 would become great enough to enable the current flowing from the upper terminal of the winding 32 to the upper terminal of the section 25 of the main winding 24 to charge the capacitor 50 sufficiently to enable that capacitor to render the controlled rectifier 62 conductive. As that controlled rectifier became conductive, it would again permit current to flow through the starting winding 34 and would also permit current to flow through the primary winding of the current transformer 68. The renewed flow of current through the starting winding 34 would enable that starting winding to again apply rotative forces to the rotor 29; and the renewed flow of current through the primary winding of the current transformer 68 would enable that current transformer to render the controlled rectifier 60 conductive. Thereafter, as long as the rotor 29 of the motor 23 rotated at a speed below its predetermined minimum speed, the controlled rectifiers 60 and 62 would become conductive and would enable the starting winding 34 to apply rotative forces to that rotor. As that rotor responded to those rotative forces to again approach its predetermined minimum speed, the value of the current flowing through the section 25 of the main winding 24 would decrease again, and that current would again lag the voltage applied to that section by only a few degrees. Thereupon the value of the voltage vector 92 would again decrease to the point where the voltage across the capacitor 50 would again be insufficient to render the controlled rectifier 62 conductive. At such time, the starting winding 34 would again be essentially disconnected from the alterating current applied to the terminals 20 and 22.

The control shown by FIG. 3 can be substituted for the control shown by FIG. 2; and, where that is done, the terminal 20 can be connected to the upper terminal of the starting winding 34 by junction 28, conductor 38, junction 46, Triac 44, capacitor 48, and conductor 42. The junction 28, conductor 38, junction 46, capacitor 50, junction 52, diode 54, and conductor 40 connect the section 25 of the main winding 24 to the upper terminal of the control winding 32. Resistor 56 is connected between the junction 52 and the gate of the Triac 44.

The operation of the motor 23 will, when the control of FIG. 3 is substituted for the control of FIG. 2, be very similar to the operation described hereinbefore. Specifically, at the time the terminals 20 and 22 are connected to the source of the single phase alternating current, the rotor 29 of the motor 23 will be stationary; and the current in the section 25 of the main winding 24 will be high and will lag the voltage applied to that section by a large angle. The value of the vector difference 92 will be large; and it will cause the capacitor 50 to charge sufficiently to render the Triac conductive. During each half-cycle of the alternating current applied to the terminals 20 and 22, wherein the terminal 20 is positive, current will flow from that terminal via junctions 28, conductor 38, junction 46, Triac 44, capacitor 48, conductor 42, starting winding 34, and junction 30 to the terminal 22. During each half-cycle of the alternating current, applied to the terminals 20 and 22, wherein the terminal 22 is positive, current will flow from that terminal via junction 30, starting winding 34, conductor 42, capacitor 48, Triac 44, junction 46, conductor 38, and junction 28 to the terminal 20. The resulting flow of current through that starting winding will enable that starting winding to coact with the main winding 24 to apply rotative forces to the rotor 29.

When that rotor reaches its predetermined minimum speed, the value of the current flowing in the section 25 of the main winding 24 will decrease, and that current will lag the voltage applied to the section 25 by only a small angle. At such time, the value of the vector difference 92 will be so small that the voltage across the capacitor 50 will be too small to render the Triac 44 conductive. Thereupon, the starting winding 34 will, effectively, be disconnected from the alternating current applied to the terminals 20 and 22. Thereafter, the rotor 29 will rotate in response to the rotative forces supplied by the main winding 24.

The operation of the motor 23 will, when the control of FIG. 4 is substituted for the control of FIG. 2, be similar to the operation described hereinbefore in connection with FIG. 2. Specifically, at the time the terminals 20 and 22 are connected to the source of single phase alternating current, the rotor 29 of the motor 23 will be stationary; and the current in the section 25 of the main winding 24 will be high and will lag the voltage applied to that section by a large angle. The value of the vector difference 92 will be large; and it will cause the capacitor 50 to charge sufficiently to render the controlled rectifier 74 conductive. During each half-cycle of the alternating current, applied to the terminals 20 and 22, wherein the terminal 20 is positive, current will flow from that terminal via junction 28, conductor 38, junction 46, junction 64, diode 76, capacitor 48, conductor 42, starting winding 34, and junction 30 to the terminal 22. During each half-cycle of the alternating current, applied to the terminals 20 and 22, wherein the terminal 22 is positive, current will flow from that terminal via junction 30, starting winding 34, conductor 42, capacitor 48, controlled rectifier 74, junction 64, junction 46, conductor 38, and junction 28 to the terminal 20. The resulting flow of current through that starting winding will enable that starting winding to coact with the main winding 24 to apply rotative forces to the rotor 29.

When that rotor reaches its predetermined minimum speed, the value of the current flowing the section 25 of the main winding 24 will decrease, and that current will lag the voltage applied to the section 25 by only a small angle. At such time, the value of the vector difference 92 will be so small that the voltage across the capacitor 50 will be too small to render the controlled rectifier 74 conductive. Thereupon, current will be unable to flow through the starting winding 34 during those half-cycles, of the alternating current applied to the terminals 20 and 22, wherein the terminal 22 is positive. Also, as soon as the capacitor 48 becomes fully charged with the left-hand terminal thereof positive, current will be unable to flow through the starting winding 34 during those half-cycles, of the alternating current applied to the terminals 20 and 22, wherein the terminal 20 is positive. Thereafter, the rotor 29 will be driven by the rotative forces supplied by the main winding 24.

The control of FIG. 4 is limited to use with an induction motor of the capacitive-starting type; because it depends upon the charging of the capacitor of that motor to block further flow of current through the diode 76. However, the controls of FIGS. 2 and 3 can be used with various kinds of induction motors that have starting windings which must be energized during the starting of those motors but which must be deenergized during normal running of those motors.

The control system provided by the present invention is very compact, because the control winding 32 occupies only a small space within the motor. Also, that control system is inexpensive; because the cost and installation of the control winding 32 are low, and because the cost and installation of the components of the controls of FIGS. 2–4 are low. If desired, other controls that are voltage-sensitive and that are inexpensive and compact could be substituted for the controls of FIGS. 1–4.

Whereas the drawing and accompanying description have shown and described several preferred embodiments of the present invention, it should be apparent to those skilled in the art that various changes may be made in the form of the invention without affecting the scope thereof.

What I claim is:

1. An induction motor which comprises:
   (a) a main winding that can be connected to a source of voltage to have a voltage applied thereto,
   (b) a starting winding,
   (c) a control winding that is magnetically coupled and electrically connected to said main winding,
   (d) said main winding responding to the voltage applied thereto to cause current to flow therethrough and thereby develop a magentic field which induces a voltage in said control winding,
   (e) said voltage applied to said main winding being capable of being represented by an applied voltage vector, and said voltage induced in said control winding being capable of being represented by an induced voltage vector, and said applied voltage vector and said induced voltage vector differing in amplitude and being angularly displaced, (f) the electrical connection between said main winding and said control winding causing said induced voltage vector corresponding to the voltage induced in said control winding to be compared with said applied voltage vector to provide a vector difference, and (g) a control that includes a selectively-conductive element which is responsive to said vector difference and which is connected to said starting winding and which can be rendered conductive to effectively connect said starting winding to, and that can be left nonconductive to effectively disconnect said starting winding from, said source of voltage, (h) said control responding to said vector difference, whenever said vector difference rises to a predetermined value, to render said selectively-conductive element conductive and thereby effectively connect said starting winding to said source of voltage, (i) said control responding to said vector difference, whenever said vector difference falls below a second predetermined value, to leave said selectively-conductive element nonconductive and thereby effectively disconnect said starting winding from said source of voltage, (j) the value of the current flowing through said main winding being high and lagging said applied voltage by a substantial angle whenever the rotor of said motor is stationary or is rotating at a speed below a predetermined value, (k) whereby said induced voltage vector corresponding to the voltage induced in said control winding will be relatively small and will make said vector difference and rise to said predetermined value, and will thus cause said control to render said selectively-conductive element conductive and thereby effectively connect said starting winding to said source of voltage, whenever the rotor of said motor is stationary or is rotating at a speed below said predetermined value, (l) said main winding responding to rotation of said rotor of said motor at speeds above said predetermined value to reduce the angle by which said current lags said applied voltage, until said induced voltage vector corresponding to the voltage induced in said control winding is so large that said vector difference falls below said second predetermined value and causes said control to leave said selectively-conductive element nonconductive and thereby effectively disconnect said starting winding from said source of voltage as long as said rotor rotates at speeds above said predetermined value.

2. An induction motor which comprises:
(a) a main winding that can be connected to a source of voltage to have a voltage applied thereto,
(b) a starting winding,
(c) a control winding that is magnetically coupled and electrically connected to said main winding,
(d) said main winding responding to the voltage applied thereto to cause current to flow therethrough and thereby develop a magnetic field which induces a voltage in said control winding,
(e) said voltage applied to said main winding being capable of being represented by an applied voltage vector, and said voltage inducted in said control winding being capable of being represented by an induced voltage vector, and said applied voltage vector and said induced voltage vector differing in amplitude and being angularly displaced,
(f) the electrical connection between said main winding and said control winding causing said induced voltage vector corresponding to the voltage induced in said control winding to be compared with said applied voltage vector to provide a vector difference, and (g) a control that includes a selectively-conductive element which is responsive to said vector difference and which is connected to said starting winding and which can be rendered conductive to effectively connect said starting winding to, and that can be left nonconductive to effectively disconnect said starting winding from, said source of voltage, (h) said control responding to said vector difference, whenever said vector difference rises to a predetermined value, to render said selectively-conductive element conductive and thereby effectively connect said starting winding to said source of voltage, (i) said control responding to said vector difference, whenever said vector difference falls below a second predetermined value, to leave said selectively-conductive element nonconductive and thereby effectively disconnect said starting winding from said source of voltage, (j) the value of the current flowing through said main winding being high and lagging said applied voltage by a substantial angle whenever the rotor of said motor is stationary or is rotating at a speed below a predetermined value, (k) whereby said induced voltage vector corresponding to the voltage induced in said control winding will be relatively small and will make said vector difference rise to said predetermined value, and will thus cause said control to render said selectively-conductive element conductive and thereby effectively connect said starting winding to said source of voltage, whenever the rotor of said motor is stationary or is rotating at a speed below said predetermined value, (l) said main winding responding to rotation of said rotor of said motor at speeds above said predetermined value to reduce the angle by which said current lags said applied voltage, until said induced voltage vector corresponding to the voltage induced in said control winding is so large that said vector difference falls below said second predetermined value and causes said control to leave said selectively-conductive element nonconductive and thereby effectively disconnect said starting winding from said source of voltage as long as said rotor rotates at speeds above said predetermined value, (m) one terminal of said control winding being connected to a tap of said main winding and the other terminal of said control winding being connected to said control, and (n) one terminal of said main winding being connected to said control.

3. An induction motor which comprises:
(a) a main winding that can be connected to a source of voltage to have a voltage applied thereto,
(b) a starting winding,
(c) a control winding that is magnetically coupled and electrically connected to said main winding,
(d) said main winding responding to the voltage applied thereto to cause current to flow therethrough and thereby develop a magnetic field which induces a voltage in said control winding,
(e) said voltage applied to said main winding being capable of being represented by an applied voltage vector, and said voltage induced in said control winding being capable of being represented by an induced voltage vector, and said applied voltage vector and said induced voltage vector differing in amplitude and being angularly displaced,
(f) the electrical connection between said main winding and said control winding causing said induced voltage vector corresponding to the voltage induced in said control winding to be compared with said applied voltage vector to provide a vector difference, and (g) a control that includes a selectively-conductive element which is responsive to said vector difference and which is connected to said starting winding and which can be rendered conductive to effectively connect said starting winding to, and that can be left nonconductive to effectively disconnect said starting winding from, said source of voltage, (h) said control responding to said vector difference, whenever said vector difference rises to a predetermined value, to render said selectively-conductive element conductive and thereby effectively connect said starting winding to said source of voltage, (i) said control responding to said vector difference, whenever said vector difference falls below a second predetermined value, to leave said selectively-conductive element nonconductive and thereby effectively disconnect said starting winding from said source of voltage, (j) the value of the current flowing through said main winding being high and lagging said applied voltage by a substantial angle whenever the rotor of said motor is stationary or is rotating at a speed below a predetermined value, (k) whereby said induced voltage vector corresponding to the voltage induced in said control winding will be relatively small and will make said vector difference rise to said predetermined value, and will thus cause said control to render said selectively-conductive element conductive and thereby effectively connect said starting winding to said source of voltage, whenever the rotor of said motor is stationary or is rotating at a speed below said predetermined value, (l) said main winding responding to rotation of said rotor of said motor at speeds above said predetermined value to reduce the angle by which said current lags said applied voltage, until said induced voltage vector corresponding to the voltage induced in said control winding is so large that said vector difference falls below said second predetermined value and causes said control to leave said selectively-conductive element nonconductive and thereby effectively disconnect said starting winding from said source of voltage as long as said rotor rotates at speeds above said predetermined value, (m) said control winding and said main winding being wound on the same magnetic core.

4. An induction motor which comprises:
(a) a main winding that can be connected to a source of voltage to have a voltage applied thereto,
(b) a starting winding,
(c) a control winding that is magnetically coupled and electrically connected to said main winding,
(d) said main winding responding to the voltage applied thereto to cause current to flow therethrough and thereby develop a magnetic field which induces a voltage in said control winding,
(e) said voltage applied to said main winding being capable of being represented by an applied voltage vector, and said voltage induced in said control winding being capable of being represented by an induced voltage vector, and said applied voltage vector and said induced voltage vector differing in amplitude and being angularly displaced.
f) the electrical connection between said main winding and said control winding causing said induced voltage vector corresponding to the voltage induced in said control winding to be compared with said applied voltage vector to provide a vector difference, and (g) a control that includes a selectively-conductive element which is responsive to said vector difference and which is connected to said starting winding and which can be rendered conductive to effectively connect said starting winding to, and that can be left nonconductive to effectively disconnect said starting winding from, said source of voltage, (h) said control responding to said vector difference, whenever said vector difference rises to a predetermined value, to render said selectively-conductive element conductive and thereby effectively connect said starting winding to said source of voltage, (i) said control responding to said vector difference, whenever said vector difference falls below a second predetermined value, to leave said selectively-conductive element nonconductive and thereby effectively disconnect said starting winding from said source of voltage, (j) the value of the current flowing through said main winding being high and lagging said applied voltage by a substantial angle whenever the rotor of said motor is stationary or is rotating at a speed below a predetermined value, (k) whereby said induced voltage vector corresponding to the voltage induced in said control winding will be relatively small and will make said vector difference rise to said predetermined value, and will thus cause said control to render said selectively-conductive element conductive and thereby effectively connect said starting winding to said source of voltage, whatever the rotor of said motor is stationary or is rotating at a speed below said predetermined value, (l) said main winding responding to rotation of said rotor of said motor at speeds above said predetermined value to reduce the angle by which said current lags said applied voltage, until said induced voltage vector corresponding to the voltage induced in said control winding is so large that said vector difference falls below said second predetermined value and causes said control to leave said selectively-conductive element non-conductive and thereby effectively disconnect said starting winding from said source of voltage as long as said rotor rotates at speeds above said predetermined value, (m) said control comprising a Triac and a voltage-sensitive firing circuit therefor.

5. An induction motor which comprises:
(a) a main winding that can be connected to a source of voltage to have a voltage applied thereto,
(b) a starting winding,
(c) a control winding that is magnetically coupled and electrically connected to said main winding,
(d) said main winding responding to the voltage applied thereto to cause current to flow therethrough and thereby develop a magnetic field which induces a voltage in said control winding,
(e) said voltage applied to said main winding being capable of being represented by an applied voltage vector, and said voltage induced in said control winding being capable of being represented by an induced voltage vector, and said applied voltage vector and said induced voltage vector differing in amplitude and being angularly displaced,
(f) the electrical connection between said main winding and said control winding causing said induced voltage vector corresponding to the voltage induced in said control winding to be compared with said applied voltage vector to provide a vector difference, and (g) a control that includes a selectively-conductive element which is responsive to said vector difference and which is connected to said starting winding and which can be rendered conductive to effectively connect said starting winding to, and that can be left nonconductive to effectively disconnect said starting winding from, said source of voltage, (h) said control responding to said vector difference, whenever said vector difference rises to a predetermined value, to render said selectively-conductive element conductive and thereby effectively connect said starting winding to said source of voltage, (i) said control responding to said vector difference, whenever said vector difference falls below a second predetermined value, to leave said selectively-conductive element nonconductive and thereby effectively disconnect said starting winding from said source of voltage, (j) the value of the current flowing through said main winding being high and lagging said applied voltage by a substantial angle whenever the rotor of said motor is stationary or is rotating at a speed below a predetermined value, (k) whereby said induced voltage vector corresponding to the voltage induced in said control winding will be relatively small and will make said vector difference rise to said predetermined value, and will thus cause said control to render said selectively-conductive element conductive and thereby effectively connect said starting winding to said source of voltage, whenever the rotor of said motor is stationary or is rotating at a speed below said predetermined value, (l) said main winding responding to rotation of said rotor of said motor at speeds above said predetermined value to reduce the angle by which said current lags said applied voltage, until said induced voltage vector corresponding to the voltage induced in said control winding is so large that said vector difference falls below said second predetermined value and causes said control to leave said selectively-conductive element nonconductive and thereby effectively disconnect said starting winding from said source of voltage as long as said rotor rotates at speeds above said predetermined value, (m) said control comprising back-to-back controlled rectifiers and a voltage-sensitive firing circuit therefor.

6. An induction motor which comprises:

(a) a main winding that can be connected to a source of voltage to have a voltage applied thereto, (b) a starting winding, (c) a control winding that is magnetically coupled and electrically connected to said main winding, (d) said main winding responding to the voltage applied thereto to cause current to flow therethrough and thereby develop a magnetic field which induces a voltage in said control winding, (e) said voltage applied to said main winding being capable of being represented by an applied voltage vector, and said voltage induced in said control winding being capable of being represented by an induced voltage vector, and said applied voltage vector and said induced voltage vector differing in amplitude and being angularly displaced, (f) the electrical connection between said main winding and said control winding causing said induced voltage vector corresponding to the voltage induced in said control winding to be compared with said applied voltage vector to provide a vector difference, and (g) a control that includes a selectively-conductive element which is responsive to said vector difference and which is connected to said starting winding and which can be rendered conductive to effectively connect said starting winding to, and that can be left nonconductive to effectively disconnect said starting winding from, said source of voltage, (h) said control responding to said vector difference whenever said vector difference rises to a predetermined value, to render said selectively-conductive element conductive and thereby effectively connect said starting winding to said source of voltage, (i) said control responding to said vector difference, whenever said vector difference falls below a second predetermined value, to leave said selectively-conductive element nonconductive and thereby effectively disconnect said starting winding from said source of voltage, (j) the value of the current flowing through said main winding being high and lagging said applied voltage by a substantial angle whenever the rotor of said motor is stationary or is rotating at a speed below a predetermined value, (k) whereby said induced voltage vector corresponding to the voltage induced in said control winding will be relatively small and will make said vector difference rise to said predetermined value, and will thus cause said control to render said selectively-conductive element conductive and thereby effectively connect said starting winding to said source of voltage, whenever the rotor of said motor is stationary or is rotating at a speed below said predetermined value, (l) said main winding responding to rotation of said rotor of said motor at speeds above said predetermined value to reduce the angle by which said current lags said applied voltage, until said induced voltage vector corresponding to the voltage induced in said control winding is so large that said vector difference falls below said second predetermined value and causes said control to leave said selectively-conductive element nonconductive and thereby effectively disconnect said starting winding from said source of voltage as long as said rotor rotates at speeds above said predetermined value, (m) said control comprising a diode and a controlled rectifier connected back-to-back and a firing circuit for said controlled rectifier.

References Cited

UNITED STATES PATENTS

| | | | |
|---|---|---|---|
| 1,315,965 | 9/1919 | Jennings | 318—221 |
| 3,116,445 | 12/1963 | Wright | 318—220 |
| 3,226,620 | 12/1965 | Elliott et al. | 318—221 |
| 3,307,093 | 2/1967 | Wright | 318—221 |

ORIS L. RADER, *Primary Examiner.*

GENE RUBINSON, *Assistant Examiner.*

U.S. Cl. X.R.

318—221